(No Model.)  2 Sheets—Sheet 1.
A. A. DENTON.
APPARATUS FOR EVAPORATING LIQUIDS BY AIR.
No. 353,293.  Patented Nov. 30, 1886.
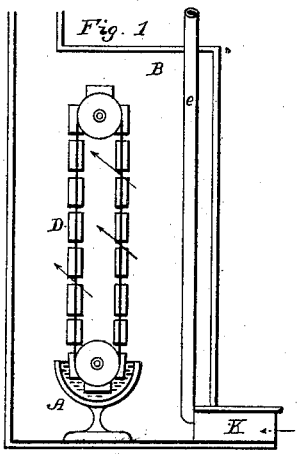
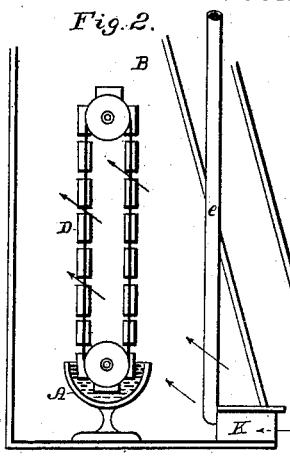
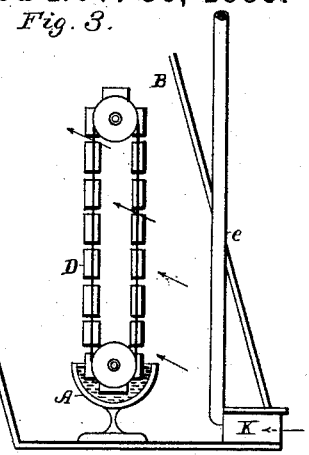
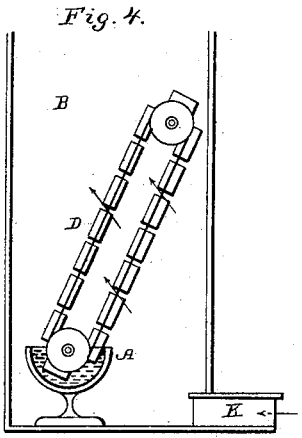
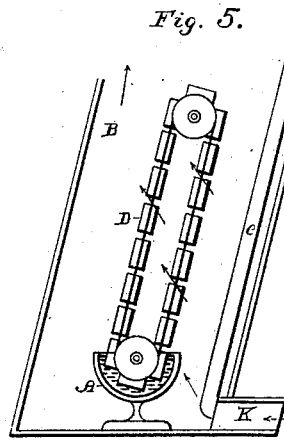
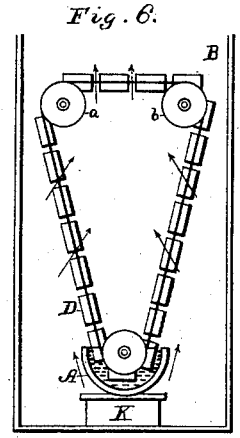
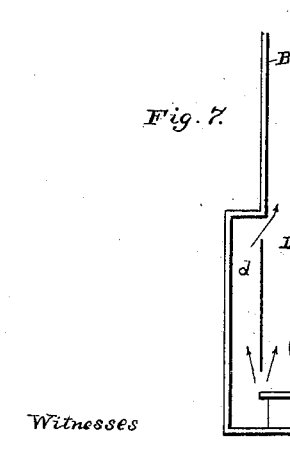
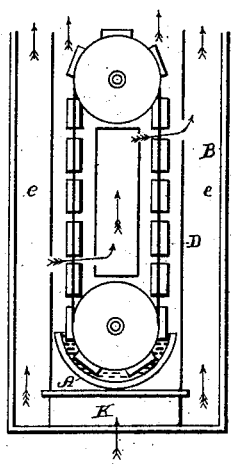
Witnesses
F. G. Fischer
L. A. Fischer
Inventor
Albert A. Denton
By his Attorney
L. Deane (No Model.)
A. A. DENTON.
APPARATUS FOR EVAPORATING LIQUIDS BY AIR.
No. 353,293. Patented Nov. 30, 1886.
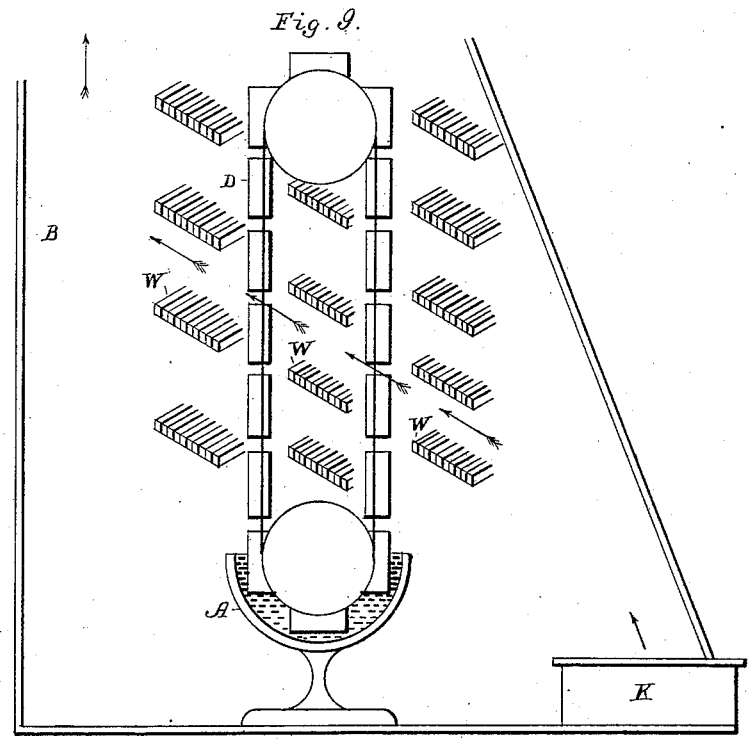
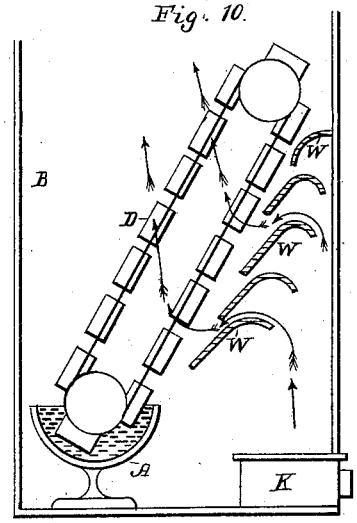
Witnesses
J. S. Fischer
L. A. Fischer
Inventor
Albert A. Denton
By his Attorney
L. Deane

UNITED STATES PATENT OFFICE.

ALBERT A. DENTON, OF BAVARIA, KANSAS.

APPARATUS FOR EVAPORATING LIQUIDS BY AIR.

SPECIFICATION forming part of Letters Patent No. 353,293, dated November 30, 1886.

Application filed March 16, 1886. Serial No. 195,463. (No model.)

*To all whom it may concern:*

Be it known that I, ALBERT A. DENTON, a citizen of the United States, residing at Bavaria, in the county of Saline and State of Kansas, have invented certain new and useful Improvements in Apparatus for Evaporating Liquids by Air, of which the following is a specification, reference being had therein to the accompanying drawings.

The object of this invention is the improvement of the apparatus for evaporating liquids by air for which Letters Patent were granted me December 23, 1884, No. 309,775, and April 6, 1886, Nos. 339,388, 339,389, and 339,390, and for which my application for a patent is now pending, filed on the same day with this.

In the accompanying drawings, Figure 1 is a side elevation of this apparatus, one side of the casing removed. Fig. 2 is a like view, but showing one wall of the casing inclined. Fig. 3 is a like view, but showing both walls inclined. Fig. 4 is a like view, but showing the conveyer inclined. Fig. 5 is a like view, conveyer and walls inclined. Fig. 6 is a like view, but showing the conveyer spread apart at the upper end; Figs. 7 and 8, like views showing different arrangements for deflecting the air to the conveyer; Figs. 9 and 10, like views showing different arrangements of air-deflectors.

In operating this apparatus constructed as described in my previous applications I found difficulty in maintaining a proper and uniform temperature in all parts of the evaporating-chamber B. The hot air was admitted to the chamber at or near the bottom of the chamber, and as it ascended through the numerous wet surfaces of the compound slats of the liquid-conveyer D it quickly absorbed water and rapidly lost its heat. In consequence of this, even when the entering air was heated to 225° to 240°, the air in the upper part of the evaporating-chamber B frequently had only a temperature of 80° to 100°. This is due to the fact that air has but little specific or latent heat. It is easily heated, and is as easily cooled. Evaporation is a cooling process, because it renders a large quantity of heat latent, and thus the rapid evaporation from the large and wet surfaces of the liquid-conveyer D quickly cooled the ascending current of air in the evaporating-chamber B below the proper temperature.

In evaporating dilute saccharine solutions, and also many other liquids, by air, it is essential to maintain an average temperature of 140° to 180° in the evaporating-chamber B, because dilute saccharine liquids and many other liquids deteriorate or are chemically changed when exposed to merely warm air, and it is necessary to keep the temperature above the fermenting-point—that is, above 140°. I also met another difficulty. The air, in ascending vertically through the perpendicular stack of wet compound slats which compose the liquid-conveyer D, as it did in my previously-described apparatus, became saturated with moisture before it reached the top of the liquid-conveyer D, and the upper part of the evaporating apparatus was thus useless.

The object of this invention is to avoid these difficulties—namely, loss of heat in the ascending current of air, and also saturation of the air before it reaches the upper part of the evaporating-chamber B. I accomplish these objects by causing the air to pass through less wet surface of the liquid-conveyer before it passes out of the evaporating-chamber B; also, by admitting fresh air at different parts of the evaporating-chamber B; also, by carrying heat in suitable flues up the walls of the evaporating-chamber B; and, also, carrying heat in a suitable flue up the central space between the ascending and the descending sides of the liquid-conveyer D; and, also, by heating the liquid in the basin in any suitable way. I acccomplish these objects by inclining the liquid-conveyer D, by inclining the evaporating-chamber B, by carrying fresh air in flues to the middle or to the upper parts of the evaporating-chamber B, instead of admitting fresh air at or near the bottom of the evaporating-chamber only, as heretofore, and by carrying heat from the furnace K in flues up the walls of the evaporating-chamber, and in the central space between the ascending and descending sides of the liquid-conveyer D, or in the central space between two liquid-conveyers, and these flues radiate heat and restore the heat lost by the evaporation which takes place in the evaporating-chamber B.

It is obvious that if the air is caused to pass horizontally across or diagonally through the liquid-conveyer D, Figs. 1, 2, 3, 4, and 5, it will come in contact with less wet surfaces, and consequently will lose less heat, and will also be less saturated than is the case when the air ascends vertically through the entire length of the liquid-conveyer, as has heretofore been done, because the height of the liquid-conveyer D is much greater than its width.

It is obvious that the air may be caused to pass horizontally across or diagonally through the liquid-conveyer D by admitting the air to one side of the evaporating-chamber only, as shown in Figs. 1, 2, 3, 4, and 5, and allowing the moist air to escape from the upper part of the opposite side only, as shown in Figs. 1, 2, 3, 4, and 5, thus compelling the air to pass horizontally across or diagonally through the liquid-conveyer D, as is indicated by arrows in Figs. 1, 2, 3, 4, and 5.

It is obvious that the air may also be caused to pass diagonally through the liquid-conveyer D by inclining one side of the evaporating-chamber B, as is shown in Fig. 2, or by inclining the evaporating-chamber B, as is shown in Figs. 3 and 5, and admitting the air to one side only of the chamber B. It is also obvious that the liquid-conveyer D may be in a vertical position, but having its ascending side and its descending side in inclined positions, as is shown in Fig. 6, so that the ascending air will pass diagonally through the compound slats of the liquid-conveyer D. I accomplish this by using two wheels, $a$ and $b$, Fig. 6, to support the upper part of the liquid-conveyer D, placed a suitable distance apart, and one wheel, $c$, Fig. 6, at the bottom of the liquid-conveyer D, or by using one large wheel at the top of the liquid-conveyer D, and a small wheel at the bottom of the liquid-conveyer D, thus spreading the top of the liquid-conveyer D, so that its sides will be in inclined positions, and so that the ascending air will pass diagonally through the compound slats of the liquid-conveyer D, instead of ascending vertically through its whole length, as has heretofore been done. In this form of the apparatus the air may be admitted to both sides of the evaporating-chamber B, as may be seen by inspecting Fig. 6. It is also obvious that the ascending air may be caused to pass diagonally through the liquid-conveyer D by inclining the liquid-conveyer D, Figs. 4 and 5, and having the evaporating-chamber B in a vertical position, as shown in Fig. 4, or having the evaporating-chamber in an inclined position, as shown in Fig. 5.

I still further avoid the loss of heat which is caused by the evaporation which takes place in the evaporating-chamber B by carrying fresh and hot air from the furnace K, Fig. 7, to the middle or to any suitable part of the evaporating-chamber B by means of flues $d\ d$, Fig. 7. By this means I re-enforce the air in the upper part of the evaporating-chamber B, and also equalize the temperature in the evaporating-chamber B, and also increase the evaporation in the upper part of the evaporating-chamber B. I also still further equalize the temperature by carrying heat from the furnace K in suitable flues, $e\ e$, up the walls of the evaporating-chamber B, as is shown in Fig. 8, and also in Figs. 2 and 5, in order that the heat which radiates from the hot flues $e\ e$ may assist to restore the heat which is absorbed by the evaporation taking place in the evaporating-chamber B, and to equalize the temperature in the evaporating-chamber B and also increase the evaporation, and also in order to utilize the otherwise waste heat of the furnace K by carrying the hot products of combustion in the furnace up through the radiating-flues $e\ e$ and receiving the radiated heat therefrom in the evaporating-chamber B, as shown in Fig. 8. I also use a radiating-flue, $f$, Fig. 8, in the central space between the ascending side and the descending side of the liquid-conveyer D, or a radiating-flue in the central space between two liquid-conveyers, thus also carrying heat from the furnace K, Fig. 8, up the central part of the evaporating-chamber B, and thus restoring the heat lost in the evaporating-chamber by the evaporation which takes place in the evaporating-chamber, and also equalizing the temperature in the evaporating-chamber B, and also utilizing the waste heat of the furnace K, Fig. 8.

It is obvious that if heat is also applied to the liquid which is being evaporated in the basin A, Fig. 8, as well as to the air which enters the evaporating-chamber B, then the evaporation which takes place in the evaporating-chamber will reduce the temperature of the air in the evaporating-chamber much less than is the case when heat is applied to the air entering the evaporation only, and is not applied to the liquid. For this reason I also apply heat to the liquid in the basin A, Fig. 8, by means of direct heat from the furnace K, or by means of steam-pipes placed in the basin A, thus also re-enforcing the temperature of the air in the evaporating-chamber B, and by all these means I preserve a uniform average temperature of 140° to 180° Fahrenheit in the evaporating-chamber, which temperature is essential in evaporating saccharine solutions and many other liquids by air, in order to avoid injurious chemical changes in the liquid caused by contact with air at a lower temperature and the evils caused by a higher temperature.

I also still further assist the air to pass sidewise or diagonally through the compound slats of the liquid-conveyer D by using deflectors W W W, Figs. 9 and 10. These deflectors may be placed at any angle suitable to divert the ascending hot air in the evaporating-chamber B from its upward tendency, and to cause it to pass diagonally through the liquid-conveyer D, instead of vertically through it, as heretofore, and also to cause the air to pass more evenly through all parts of the liquid-conveyer D from the bottom to the top. These deflectors may be placed on one side only of the liquid-conveyer, or on both sides, and also in the space between the ascending and the descending sides of the liquid-conveyer D, as may be best, as shown in Fig. 9 at W W W.

When the liquid-conveyer is inclined, as in Fig. 10, these deflectors may be so placed as to overlap each other slightly, and may be so shaped as to serve the double purpose of deflecting the air sidewise and evenly through the liquid-conveyer D, and also for the purpose of catching the liquid which drops from the liquid-conveyer D and returning it to the basin A, as is shown in Fig. 10 at W. These deflectors may be placed any suitable distance apart to accomplish their object of evenly dividing the air and of diverting it through the liquid-conveyer D, and of returning the liquid dropping from the liquid-conveyer D to the basin A.

What I claim as my invention, and desire to secure by Letters Patent, is—

1. In an evaporating apparatus, as described, the liquid-conveyers inclined in any suitable way and combined with fresh-air inlets, whereby the air is caused to pass diagonally through the liquid-conveyer, substantially as described.

2. In an air evaporator, radiating-flues radiating heat from the sides of the evaporating-chamber to restore the heat absorbed by evaporation in the evaporating-chamber, as set forth.

3. In an evaporating apparatus, a liquid-conveyer having spreading wheels $a$ and $b$ at its upper part, substantially as described.

4. In an air-evaporator, applying heat to the liquid which is being evaporated in the basin, by means substantially as described, for the purpose of re-enforcing the temperature of the air in the evaporating-chamber, as set forth.

5. In an air-evaporator, the combination of a heater heating the liquid being evaporated and a heater heating the air which passes through the evaporating-chamber, as set forth.

6. In an evaporating apparatus, an inclined evaporating-chamber and an inclined liquid-conveyer, combined with supply-pipes introducing fresh air to any part of the evaporating-chamber, and a heater for the liquid and a heater for the air, all substantially as described.

7. In an air-evaporator for liquids, deflectors placed at any angle suitable to divert the air from its upward tendency and to cause it to pass evenly through the liquid-conveyer sidewise or diagonally instead of vertically, as set forth.

8. In an inclined air-evaporator, the deflectors slightly overlapping each other, so as to return the liquid dropping from the liquid-conveyer to the basin, and also shaped so as to divert the air from its upward tendency, and to cause it to pass sidewise or diagonally through the liquid-conveyer and evenly through all parts of the liquid-conveyer, as set forth.

In testimony whereof I affix my signature in presence of two witnesses.

ALBERT A. DENTON.

Witnesses:
 ORLO HUBBARD,
 HERMAN HUBBARD.